(12) United States Patent
Todd et al.

(10) Patent No.: US 8,030,249 B2
(45) Date of Patent: *Oct. 4, 2011

(54) METHODS AND COMPOSITIONS RELATING TO THE HYDROLYSIS OF WATER-HYDROLYSABLE MATERIALS

(75) Inventors: Bradley L. Todd, Duncan, OK (US); Karen Savery, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 786 days.

This patent is subject to a terminal disclaimer.

(21) Appl. No.: 11/046,043

(22) Filed: Jan. 28, 2005

(65) Prior Publication Data

US 2006/0172893 A1 Aug. 3, 2006

(51) Int. Cl.
*C09K 8/68* (2006.01)

(52) U.S. Cl. ........ 507/211; 106/802; 507/219; 507/260; 166/305.1

(58) Field of Classification Search .......... 507/211, 507/219, 260; 106/802; 166/305.1
See application file for complete search history.

(56) References Cited

U.S. PATENT DOCUMENTS

| | | | |
|---|---|---|---|
| 2,238,671 A | 4/1941 | Woodhouse | 166/21 |
| 2,703,316 A | 3/1955 | Palmer | 260/78.3 |
| 3,173,484 A | 3/1965 | Huitt et al. | 166/280.1 |
| 3,195,635 A | 7/1965 | Fast | 166/280.1 |
| 3,272,650 A | 9/1966 | MacVittie | 134/7 |
| 3,302,719 A | 2/1967 | Fischer | 166/280.2 |
| 3,364,995 A | 1/1968 | Atkins et al. | 166/280.1 |
| 3,366,178 A | 1/1968 | Malone et al. | 166/280.1 |
| 3,455,390 A | 7/1969 | Gallus | 166/295 |
| 3,784,585 A | 1/1974 | Schmitt et al. | 260/861 |
| 3,806,465 A * | 4/1974 | Karl et al. | 516/102 |
| 3,819,525 A | 6/1974 | Hattenbrun | 252/132 |
| 3,828,854 A | 8/1974 | Templeton et al. | 166/307 |
| 3,868,998 A | 3/1975 | Lybarger et al. | 166/278 |
| 3,912,692 A | 10/1975 | Casey et al. | 260/78.3 |
| 3,948,672 A | 4/1976 | Harnsberger | 106/90 |
| 3,955,993 A | 5/1976 | Curtice | 106/90 |
| 3,960,736 A | 6/1976 | Free et al. | 252/8.55 R |
| 3,968,840 A | 7/1976 | Tate | 166/280.1 |

(Continued)

FOREIGN PATENT DOCUMENTS

CA 2 491 934 1/2004

(Continued)

OTHER PUBLICATIONS

Cordes, et al., *Mechanism and Catalysis for Hydrolysis of Acetals, Ketals, and Other Esters*, Department of Chemistry, Indiana University, Bloomington, Indiana, Chemical Reviews, 1974, vol. 74, No. 5, pp. 581-603.

(Continued)

*Primary Examiner* — Alicia Toscano
(74) *Attorney, Agent, or Firm* — Robert A. Kent; McDermott Will & Emery LLP

(57) ABSTRACT

Methods relating to the hydrolysis of water-hydrolysable materials are provided. In one embodiment, a method of treating at least a portion of a subterranean formation is provided, the method comprising: providing a water-hydrolysable material; introducing the water-hydrolysable material into a well bore penetrating the subterranean formation; providing a treatment fluid comprising an aqueous liquid and a water-miscible solvent; introducing the treatment fluid into the well bore so as to contact the water-hydrolysable material; and allowing the water-hydrolysable material to hydrolyze. Methods of completing a well also are provided.

17 Claims, 2 Drawing Sheets

U.S. PATENT DOCUMENTS

Figure 1:
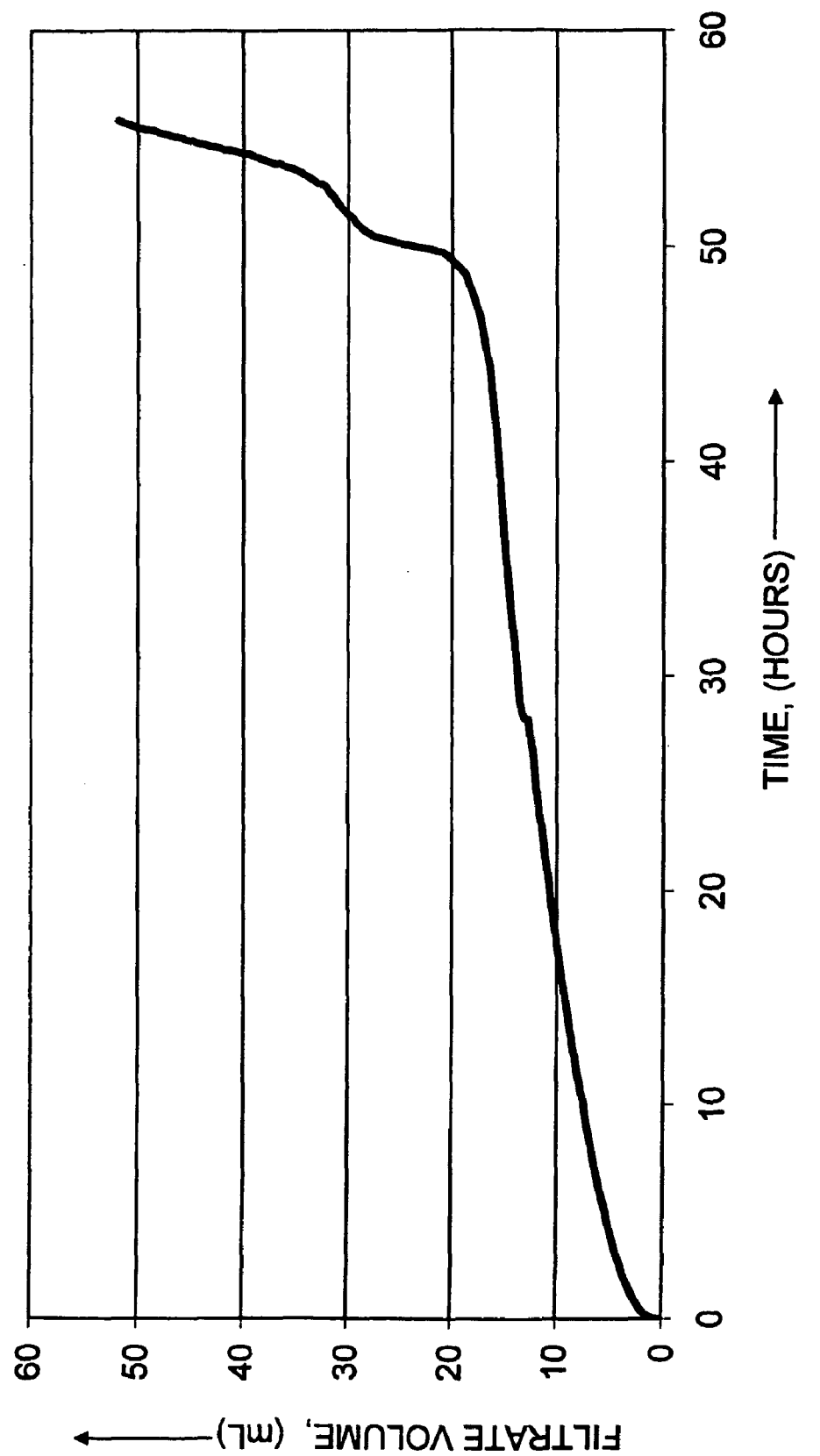

| | | | |
|---|---|---|---|
| 3,998,272 A | 12/1976 | Maly | 166/281 |
| 3,998,744 A | 12/1976 | Arnold et al. | 507/269 |
| 4,068,718 A | 1/1978 | Cooke, Jr. et al. | 166/280.2 |
| 4,169,798 A | 10/1979 | DeMartino | 252/8.55 R |
| 4,172,066 A | 10/1979 | Zweigle et al. | 260/29.6 TA |
| 4,261,421 A | 4/1981 | Watanabe | 166/281 |
| 4,387,769 A | 6/1983 | Erbstoesser et al. | 166/295 |
| 4,392,964 A * | 7/1983 | House et al. | 507/114 |
| 4,460,052 A | 7/1984 | Gockel | 175/72 |
| 4,470,915 A | 9/1984 | Conway | 252/8.55 R |
| 4,498,995 A | 2/1985 | Gockel | 252/8.5 LC |
| 4,521,316 A * | 6/1985 | Sikorski | 507/274 |
| 4,526,695 A | 7/1985 | Erbstoesser et al. | 252/8.55 R |
| 4,694,905 A | 9/1987 | Armbruster | 166/280 |
| 4,715,967 A | 12/1987 | Bellis et al. | 252/8.551 |
| 4,716,964 A | 1/1988 | Erbstoesser et al. | 166/284 |
| 4,772,346 A | 9/1988 | Anderson et al. | |
| 4,785,884 A | 11/1988 | Armbruster | 166/280 |
| 4,793,416 A | 12/1988 | Mitchell | |
| 4,797,262 A | 1/1989 | Dewitz | 422/142 |
| 4,809,783 A * | 3/1989 | Hollenbeck et al. | 166/307 |
| 4,817,721 A | 4/1989 | Pober | 166/295 |
| 4,843,118 A | 6/1989 | Lai et al. | 524/555 |
| 4,848,467 A | 7/1989 | Cantu et al. | 166/281 |
| 4,886,354 A | 12/1989 | Welch et al. | 356/70 |
| 4,957,165 A | 9/1990 | Cantu et al. | 166/295 |
| 4,961,466 A * | 10/1990 | Himes et al. | 166/308.5 |
| 4,982,793 A | 1/1991 | Holtmyer et al. | 166/305.1 |
| 4,986,353 A | 1/1991 | Clark et al. | 166/279 |
| 4,986,354 A | 1/1991 | Cantu et al. | 166/279 |
| 4,986,355 A * | 1/1991 | Casad et al. | 166/295 |
| 5,067,565 A | 11/1991 | Holtmyer et al. | 166/305.1 |
| 5,082,056 A | 1/1992 | Tackett, Jr. | 166/295 |
| 5,122,549 A | 6/1992 | Holtmyer et al. | 523/130 |
| 5,142,023 A | 8/1992 | Gruber et al. | 528/354 |
| 5,216,050 A | 6/1993 | Sinclair | 524/108 |
| 5,247,059 A | 9/1993 | Gruber et al. | 528/354 |
| 5,249,628 A | 10/1993 | Surjaatmadia | 166/305 |
| 5,295,542 A | 3/1994 | Cole et al. | 166/278 |
| 5,304,620 A * | 4/1994 | Holtmyer et al. | 527/310 |
| 5,325,923 A | 7/1994 | Surjaatmadja et al. | 166/308 |
| 5,330,005 A | 7/1994 | Card et al. | 166/280 |
| 5,359,026 A | 10/1994 | Gruber | 528/354 |
| 5,360,068 A | 11/1994 | Sprunt et al. | 166/259 |
| 5,363,916 A | 11/1994 | Himes et al. | 166/276 |
| 5,373,901 A | 12/1994 | Norman et al. | 166/300 |
| 5,386,874 A | 2/1995 | Laramay et al. | 166/300 |
| 5,396,957 A | 3/1995 | Surjaatmadja et al. | 166/308 |
| 5,402,846 A | 4/1995 | Jennings, Jr. et al. | 166/259 |
| 5,439,055 A | 8/1995 | Card et al. | 166/280 |
| 5,460,226 A | 10/1995 | Lawton et al. | 166/300 |
| 5,464,060 A | 11/1995 | Hale et al. | 166/293 |
| 5,475,080 A | 12/1995 | Gruber et al. | 528/354 |
| 5,484,881 A | 1/1996 | Gruber et al. | 528/354 |
| 5,497,830 A | 3/1996 | Boles et al. | 166/300 |
| 5,499,678 A | 3/1996 | Surjaatmadja et al. | 166/298 |
| 5,505,787 A | 4/1996 | Yamaguchi | 134/4 |
| 5,512,071 A | 4/1996 | Yam et al. | 51/307 |
| 5,521,242 A | 5/1996 | Supcoe et al. | |
| 5,536,807 A | 7/1996 | Gruber et al. | 528/354 |
| 5,591,700 A | 1/1997 | Harris et al. | 507/204 |
| 5,594,095 A | 1/1997 | Gruber et al. | 528/354 |
| 5,604,186 A | 2/1997 | Hunt et al. | 507/204 |
| 5,607,905 A | 3/1997 | Dobson, Jr. et al. | 507/211 |
| 5,670,473 A | 9/1997 | Scepanski | 510/445 |
| 5,698,322 A | 12/1997 | Tsai et al. | 428/373 |
| 5,765,642 A | 6/1998 | Surjaatmadja | 166/297 |
| 5,783,205 A | 7/1998 | Berggren et al. | |
| 5,791,415 A | 8/1998 | Nguyen et al. | 166/280 |
| 5,833,000 A | 11/1998 | Weaver et al. | 166/276 |
| 5,849,401 A | 12/1998 | El-Afandi et al. | 428/215 |
| 5,853,048 A | 12/1998 | Weaver et al. | 166/279 |
| 5,893,416 A | 4/1999 | Read | 166/304 |
| 5,908,073 A | 6/1999 | Nguyen et al. | 166/276 |
| 5,924,488 A | 7/1999 | Nguyen et al. | 166/280 |
| 5,964,291 A | 10/1999 | Bourne et al. | 166/279 |
| 5,996,694 A | 12/1999 | Dewprashad et al. | 166/294 |
| 6,004,400 A | 12/1999 | Bishop et al. | 134/2 |
| 6,024,170 A | 2/2000 | McCabe et al. | 166/300 |
| 6,028,113 A | 2/2000 | Scepanski | 514/643 |
| 6,047,772 A | 4/2000 | Weaver et al. | 166/276 |
| 6,114,410 A | 9/2000 | Betzold | 523/130 |
| 6,123,965 A | 9/2000 | Jacob et al. | 424/489 |
| 6,131,661 A | 10/2000 | Conner et al. | |
| 6,135,987 A | 10/2000 | Tsai et al. | 604/365 |
| 6,143,698 A | 11/2000 | Murphey et al. | |
| 6,162,766 A | 12/2000 | Muir et al. | 507/267 |
| 6,169,058 B1 | 1/2001 | Le et al. | 507/222 |
| 6,172,011 B1 | 1/2001 | Card et al. | 507/204 |
| 6,189,615 B1 | 2/2001 | Sydansk | 166/270 |
| 6,202,751 B1 | 3/2001 | Chatterji et al. | 166/276 |
| 6,209,643 B1 | 4/2001 | Nguyen et al. | 166/276 |
| 6,209,646 B1 | 4/2001 | Reddy et al. | 166/300 |
| 6,214,773 B1 | 4/2001 | Harris et al. | 507/271 |
| 6,242,390 B1 | 6/2001 | Mitchell et al. | 507/211 |
| 6,260,622 B1 | 7/2001 | Blok et al. | 166/305.1 |
| 6,311,773 B1 | 11/2001 | Todd et al. | 166/280 |
| 6,323,307 B1 | 11/2001 | Bigg et al. | 528/354 |
| 6,326,458 B1 | 12/2001 | Gruber et al. | 528/354 |
| 6,328,105 B1 | 12/2001 | Betzold | 166/280 |
| 6,357,527 B1 | 3/2002 | Norman et al. | 166/300 |
| 6,364,945 B1 | 4/2002 | Chatterji et al. | 106/677 |
| 6,380,138 B1 | 4/2002 | Ischy et al. | 507/204 |
| 6,387,986 B1 | 5/2002 | Moradi-Araghi et al. | 523/211 |
| 6,390,195 B1 | 5/2002 | Nguyen et al. | 166/276 |
| 6,394,185 B1 | 5/2002 | Constien | 166/296 |
| 6,422,314 B1 | 7/2002 | Todd et al. | 166/312 |
| 6,454,003 B1 | 9/2002 | Chang et al. | 166/270 |
| 6,485,947 B1 | 11/2002 | Rajgarhia et al. | 435/139 |
| 6,488,763 B2 | 12/2002 | Brothers et al. | 106/692 |
| 6,494,263 B2 | 12/2002 | Todd | 166/312 |
| 6,508,305 B1 | 1/2003 | Brannon et al. | 166/293 |
| 6,509,301 B1 * | 1/2003 | Vollmer | 507/236 |
| 6,527,051 B1 | 3/2003 | Reddy et al. | 166/300 |
| 6,554,071 B1 | 4/2003 | Reddy et al. | 166/293 |
| 6,569,814 B1 | 5/2003 | Brady et al. | 507/201 |
| 6,599,863 B1 | 7/2003 | Palmer et al. | 507/219 |
| 6,667,279 B1 | 12/2003 | Hessert et al. | 507/225 |
| 6,669,771 B2 | 12/2003 | Tokiwa et al. | 106/162.7 |
| 6,681,856 B1 | 1/2004 | Chatterji et al. | 166/294 |
| 6,686,328 B1 | 2/2004 | Binder | 510/446 |
| 6,702,023 B1 | 3/2004 | Harris et al. | 166/307 |
| 6,710,019 B1 | 3/2004 | Sawdon et al. | 507/136 |
| 6,761,218 B2 | 7/2004 | Nguyen et al. | 166/278 |
| 6,763,888 B1 | 7/2004 | Harris et al. | 166/305.1 |
| 6,793,018 B2 | 9/2004 | Dawson et al. | 166/300 |
| 6,817,414 B2 | 11/2004 | Lee | 166/278 |
| 6,837,309 B2 | 1/2005 | Boney et al. | 166/280.2 |
| 6,896,058 B2 | 5/2005 | Munoz, Jr. et al. | 166/279 |
| 6,949,491 B2 | 9/2005 | Cooke, Jr. | 507/219 |
| 6,983,801 B2 | 1/2006 | Dawson et al. | 166/300 |
| 7,063,151 B2 | 6/2006 | Nguyen et al. | |
| 7,080,688 B2 | 7/2006 | Todd et al. | 166/278 |
| 7,178,596 B2 | 2/2007 | Blauch et al. | 166/280 |
| 7,195,068 B2 | 3/2007 | Todd | |
| 7,219,731 B2 | 5/2007 | Sullivan et al. | 166/278 |
| 7,261,156 B2 | 8/2007 | Nguyen et al. | |
| 7,264,051 B2 | 9/2007 | Nguyen et al. | |
| 7,299,876 B2 | 11/2007 | Lord et al. | |
| 7,306,037 B2 | 12/2007 | Nguyen et al. | |
| 7,353,876 B2 | 4/2008 | Savery et al. | |
| 7,353,879 B2 | 4/2008 | Todd et al. | |
| 7,413,017 B2 | 8/2008 | Nguyen et al. | |
| 7,448,450 B2 | 11/2008 | Luke et al. | |
| 7,455,112 B2 | 11/2008 | Moorehead et al. | |
| 7,461,697 B2 | 12/2008 | Todd et al. | |
| 7,475,728 B2 | 1/2009 | Pauls et al. | |
| 7,484,564 B2 | 2/2009 | Welton et al. | |
| 7,497,258 B2 | 3/2009 | Savery et al. | |
| 7,497,278 B2 | 3/2009 | Schriener et al. | |
| 7,506,689 B2 | 3/2009 | Surjaatmadja et al. | |
| 7,547,665 B2 | 6/2009 | Welton et al. | |
| 7,595,280 B2 | 9/2009 | Welton et al. | |
| 7,598,208 B2 | 10/2009 | Todd | |
| 7,608,566 B2 | 10/2009 | Saini et al. | |
| 7,608,567 B2 | 10/2009 | Saini | |
| 2001/0016562 A1 | 8/2001 | Muir et al. | 507/201 |

| | | | |
|---|---|---|---|
| 2002/0036088 A1 | 3/2002 | Todd | |
| 2002/0125012 A1 | 9/2002 | Dawson et al. | 166/300 |
| 2003/0060374 A1 | 3/2003 | Cooke, Jr. | 507/200 |
| 2003/0114314 A1 | 6/2003 | Ballard et al. | 507/100 |
| 2003/0130133 A1 | 7/2003 | Vollmer | 507/100 |
| 2003/0181532 A1* | 9/2003 | Parris et al. | 516/20 |
| 2003/0188766 A1 | 10/2003 | Banerjee et al. | 134/7 |
| 2003/0220203 A1 | 11/2003 | Harris, Jr. et al. | |
| 2003/0234103 A1 | 12/2003 | Lee et al. | 166/293 |
| 2004/0014607 A1 | 1/2004 | Sinclair et al. | 507/200 |
| 2004/0040706 A1 | 3/2004 | Hossaini et al. | 166/278 |
| 2004/0055747 A1 | 3/2004 | Lee | 166/278 |
| 2004/0072700 A1* | 4/2004 | Gupta et al. | 507/213 |
| 2004/0094300 A1 | 5/2004 | Sullivan et al. | 166/308.1 |
| 2004/0106525 A1 | 6/2004 | Willberg et al. | 507/200 |
| 2004/0138068 A1 | 7/2004 | Rimmer et al. | 507/100 |
| 2004/0138070 A1* | 7/2004 | Jones et al. | 507/112 |
| 2004/0152601 A1* | 8/2004 | Still et al. | 507/100 |
| 2004/0152602 A1 | 8/2004 | Boles | 507/100 |
| 2004/0216876 A1 | 11/2004 | Lee | 166/280.1 |
| 2004/0231845 A1 | 11/2004 | Cooke, Jr. | 166/279 |
| 2004/0261993 A1 | 12/2004 | Nguyen | 166/276 |
| 2004/0261995 A1 | 12/2004 | Nguyen et al. | 166/279 |
| 2004/0261996 A1 | 12/2004 | Munoz, Jr. et al. | 166/279 |
| 2004/0261999 A1 | 12/2004 | Nguyen | 166/292 |
| 2005/0006095 A1 | 1/2005 | Justus et al. | |
| 2005/0028976 A1 | 2/2005 | Nguyen | 166/276 |
| 2005/0034861 A1 | 2/2005 | Saini et al. | 166/278 |
| 2005/0034865 A1 | 2/2005 | Todd et al. | 166/304 |
| 2005/0034868 A1 | 2/2005 | Frost et al. | 166/307 |
| 2005/0103496 A1 | 5/2005 | Todd et al. | 166/278 |
| 2005/0113264 A1* | 5/2005 | Vollmer | 507/211 |
| 2005/0126785 A1 | 6/2005 | Todd | 166/307 |
| 2005/0252659 A1 | 11/2005 | Sullivan et al. | 166/280.1 |
| 2005/0272613 A1 | 12/2005 | Cooke | 507/219 |
| 2006/0105917 A1 | 5/2006 | Munoz | 507/103 |
| 2006/0169448 A1 | 8/2006 | Savery et al. | |
| 2006/0169452 A1 | 8/2006 | Savery et al. | |
| 2006/0169453 A1 | 8/2006 | Savery et al. | |
| 2006/0172893 A1 | 8/2006 | Todd et al. | |
| 2006/0205608 A1 | 9/2006 | Todd | |
| 2006/0243449 A1 | 11/2006 | Welton et al. | |
| 2006/0247135 A1 | 11/2006 | Welton et al. | |
| 2006/0254774 A1 | 11/2006 | Saini et al. | |
| 2006/0283597 A1 | 12/2006 | Schriener et al. | 166/300 |
| 2007/0042912 A1 | 2/2007 | Welton et al. | |
| 2007/0049501 A1 | 3/2007 | Saini et al. | |
| 2007/0066492 A1 | 3/2007 | Funkhouser et al. | |
| 2007/0066493 A1 | 3/2007 | Funkhouser et al. | |
| 2007/0078063 A1 | 4/2007 | Munoz | |
| 2007/0078064 A1 | 4/2007 | Munoz et al. | |
| 2007/0238623 A1 | 10/2007 | Saini et al. | |
| 2007/0281868 A1 | 12/2007 | Pauls et al. | |
| 2008/0026955 A1 | 1/2008 | Munoz et al. | |
| 2008/0026959 A1 | 1/2008 | Munoz et al. | |
| 2008/0026960 A1 | 1/2008 | Munoz et al. | |
| 2008/0027157 A1 | 1/2008 | Munoz et al. | |
| 2008/0070810 A1 | 3/2008 | Mang | |
| 2008/0139415 A1 | 6/2008 | Todd et al. | |
| 2008/0169102 A1 | 7/2008 | Carbajal et al. | |
| 2009/0062157 A1 | 3/2009 | Munoz et al. | |
| 2009/0258798 A1 | 10/2009 | Munoz et al. | |

FOREIGN PATENT DOCUMENTS

| | | |
|---|---|---|
| CA | 2 560 938 | 10/2005 |
| EP | 0 510 762 A2 | 10/1992 |
| EP | 0 879 935 A2 | 11/1998 |
| EP | 0 879 935 A3 | 2/1999 |
| EP | 1 413 710 A1 | 4/2004 |
| GB | 2 412 389 A | 3/2004 |
| JP | 2004181820 A | 7/2004 |
| WO | WO 93/15127 | 8/1993 |
| WO | WO 93/15127 A1 | 8/1993 |
| WO | WO 94/07949 | 4/1994 |
| WO | WO 94/07949 A1 | 4/1994 |
| WO | WO 94/08078 | 4/1994 |
| WO | WO 94/08078 A1 | 4/1994 |
| WO | WO 94/08090 | 4/1994 |
| WO | WO 94/08090 A1 | 4/1994 |
| WO | WO 95/09879 | 4/1995 |
| WO | WO 95/09879 A1 | 4/1995 |
| WO | WO 97/11845 | 4/1997 |
| WO | WO 97/11845 A1 | 4/1997 |
| WO | WO 99/27229 A1 | 6/1999 |
| WO | WO 02/057022 | 9/2000 |
| WO | WO 01/02698 | 1/2001 |
| WO | WO 01/87797 A1 | 11/2001 |
| WO | WO 02/55843 A1 | 1/2002 |
| WO | WO 02/12674 A1 | 3/2003 |
| WO | WO 03/027431 A2 | 4/2003 |
| WO | WO 03/027431 A3 | 4/2003 |
| WO | WO 2004/007905 | 1/2004 |
| WO | WO 2004/037946 A1 | 5/2004 |
| WO | WO 2004/038176 A1 | 5/2004 |

OTHER PUBLICATIONS

Todd, et al., *A Chemical "Trigger" Useful for Oilfield Applications*, Society of Petroleum Engineers, Inc., SPE 92709, Feb. 4, 2005.

Skrabal et al., *The Hydrolysis Rate Of Orthoformic Acid Ethyl Ether*, Chemical Institute of the University of Graz, pp. 1-38, Jan. 13, 1921.

Heller, et al., *Poly(ortho esters)—From Concept to Reality*, Biomacromolecules, vol. 5, No. 5, 2004 (pp. 1625-1632), May 9, 1979.

Schwach-Abdellaoui, et al., *Hydrolysis and Erosion Studies of Autocatalyzed Poly(ortho esters) Containing Lactoyl-Lactyl Acid Dimers*, American Chemical Society, vol. 32, No. 2, 1999 (pp. 301-307).

Ng, et al., *Synthesis and Erosion Studies of Self-Catalyzed Poly(ortho ester)s*, American Chemical Society, vol. 30, No. 4, 1997 (pp. 770-772).

Ng, et al., *Development of a Poly(ortho ester) prototype With a Latent Acid in the Polymer Backbone for 5-fluorouracil Delivery*, Journal of Controlled Release 65 (2000), (pp. 367-374).

Rothen-Weinhold, et al., Release of BSA from poly(ortho ester) extruded thin strands, *Journal of Controlled Release* 71, 2001, (pp. 31-37).

Heller, et al., *Poly(ortho ester)s—their development and some recent applications*, European-Journal of Pharmaceutics and Biopharmaceutics, 50, 2000, (pp. 121-128).

Heller, et al., *Poly(ortho esters); synthesis, characterization, properties and uses*, Advanced Drug Delivery Reviews, 54, 2002, (pp. 1015-1039).

Heller, et al., *Poly(ortho esters) For the Pulsed and Continuous Delivery of Peptides and Proteins*, Controlled Release and Biomedical Polymers Department, SRI International, (pp. 39-46).

Zignani, et al., *Subconjunctival biocompatibility of a viscous bioerodable poly(ortho ester)*, J. Biomed Mater Res, 39, 1998, pp. 277-285.

Toncheva, et al., *Use of Block Copolymers of Poly(Ortho Esters) and Poly (Ethylene Glycol)*, Journal of Drug Targeting, 2003, vol. 11(6), pp. 345-353.

Schwach-Abdellaoui, et al., *Control of Molecular Weight for Auto-Catalyzed Poly(ortho ester) Obtained by Polycondensation Reaction*, International Journal of Polymer Anal. Charact., 7: 145-161, 2002, pp. 145-161.

Heller, et al., *Release of Norethindrone from Poly(Ortho Esters)*, Polymer Engineering and Science, Mid-Aug. 1981, vol. 21, No. 11 (pp. 727-731).

Y. Chiang et al.: "Hydrolysis of Ortho Esters: Further Investigation of the Factors Which Control the Rate-Determining Step," Engineering Information Inc., NY, NY, vol. 105, No. 23 (XP-002322842), Nov. 16, 1983.

M. Ahmad, et al.: "Ortho Ester Hydrolysis: Direct Evidence for a Three-Stage Reaction Mechanism," Engineering Information Inc., NY, NY, vol. 101, No. 10 (XP-002322843), May 9, 1979.

U.S. Appl. No. 10/650,101, filed Aug. 26, 2003, Todd, et al.
U.S. Appl. No. 10/655,883, filed Sep. 5, 2003, Nguyen.
U.S. Appl. No. 10/661,173, filed Sep. 11, 2003, Todd, et al.
U.S. Appl. No. 10/664,126, filed Sep. 17, 2003, Todd, et al.
U.S. Appl. No. 10/736,152, filed Dec. 15, 2003, Todd.
U.S. Appl. No. 10/765,334, filed Jan. 27, 2004, Todd, et al.
U.S. Appl. No. 10/768,323, filed Jan. 30, 2004, Roddy, et al.

U.S. Appl. No. 10/768,864, filed Jan. 30, 2004, Roddy, et al.
U.S. Appl. No. 10/769,490, filed Jan. 30, 2004, Roddy, et al.
U.S. Appl. No. 10/783,207, filed Feb. 20, 2004, Surjaatmadja, et al.
U.S. Appl. No. 10/785,300, filed Feb. 24, 2004, Frost, et al.
U.S. Appl. No. 10/802,340, filed Mar. 17, 2004, Reddy, et al.
U.S. Appl. No. 10/803,668, filed Mar. 17, 2004, Todd, et al.
U.S. Appl. No. 10/803,689, filed Mar. 18, 2004, Todd, et al.
U.S. Appl. No. 10/832,163, filed Apr. 26, 2004, Munoz, Jr., et al.
U.S. Appl. No. 10/897,509, filed Jul. 23, 2004, Pauls, et al.
U.S. Appl. No. 10/915,024, filed Aug. 10, 2004, Nguyen.
U.S. Appl. No. 10/932,749, filed Sep. 2, 2004, Harris, et al.
U.S. Appl. No. 10/933,705, filed Sep. 3, 2004, Kalman.
U.S. Appl. No. 10/947,427, filed Sep. 20, 2004, Blauch, et al.
U.S. Appl. No. 10/950,072, filed Sep. 24, 2004, Nguyen, et al.
U.S. Appl. No. 10/991,228, filed Nov. 17, 2004, Munoz, Jr., et al.
U.S. Appl. No. 10/991,248, filed Nov. 17, 2004, Munoz, Jr., et al.
U.S. Appl. No. 11/046,652, filed Jan. 28, 2005, Todd, et al.
U.S. Appl. No. 10/864,061, filed Jun. 9, 2004, Blauch, et al.
U.S. Appl. No. 10/864,618, filed Jun. 9, 2004, Blauch, et al.
U.S. Appl. No. 11/046,652, Todd, et al.
Simmons, et al., *Poly(phenyllactide): Synthesis, Characterization, and Hydrolytic Degradation*, Biomacromolecules, vol. 2, No. 2, 2001 (pp. 658-663).
Yin, et al., *Preparation and Characterization of Substituted Polylactides*, American Chemical Society, vol. 32, No. 23, 1999 (pp. 7711-7718).
Yin, et al., *Synthesis and Properties of Polymers Derived form Substituted Lactic Acids*, American Chemical Society, Ch. 12, 2001 (pp. 147-159).
Cantu, et al, *Laboratory and Field Evaluation of a Combined Fluid-Loss-Control Additive and Gel Breaker for Fracturing Fluids*, SPE 18211, Society of Petroleum Engineers, 1990.
Love, et al, *Selectively Placing Many Fractures in Openhole Horizontal Wells Improves Production*, SPE 50422, Society of Petroleum Engineers, 1998.
McDaniel, et al, *Evolving New Stimulation Process Proves Highly Effective in Level 1 Dual-Lateral Completion*, SPE 78697, Society of Petroleum Engineers, 2002.
Albertsson, et al, *Aliphatic Polyesters: Systhesis, Properties and Applications*, Advances in Polymer Science, vol. 157, Degradable Aliphatic Polyesters, 2002.
Dechy-Cabaret, et al, *Controlled Ring-Opening Polymerization of Lactide and Glycolide*, American Chemical Society, Chemical Reviews, A-Z, AA-AD, received 2004.
Funkhouser, et al, *Synthetic Polymer Fracturing Fluid for High-Temperature Applications*, SPE 80236, Society of Petroleum Engineers, 2003.
*Chelating Agents*, Encyclopedia of Chemical Technology, vol. 5 (764-795).
Vichaibun, et al, *A New Assay for the Enzymatic Degradation of Polylactic Acid, Short Report*, ScienceAsia, vol. 29, 2003 (pp. 297-300).
Halliburton, *SurgiFrac$^{SM}$ Service, A Quick and Cost-Effective Method to Help Boost Production From Openhole Horizontal Completions, Halliburton Communications*, HO3297, 2002.
Halliburton, *Cobra Frac$^{SM}$ Service, Coiled Tubing Fracturing—Cost-Effective Method for Stimulating Untapped Reserves*, HO2319R, Halliburton Energy Services, 2000.
Halliburton, *CobraJet Frac$^{SM}$ Service, Cost-effective Technology That Can Help Reduce Cost Per BOE Produced, Shorten Cycle Time and Reduce Capex*, Halliburton Communications.
Office Action dated Oct. 2, 2007 for U.S. Appl. No. 11/046,652.
NatureWorks Product Bulletin entitled NatureWorks PLA Polymer 3001D, Injection Molding Process Guide, 2005.
NatureWorks Product Bulletin entitled NatureWorks PLA Polymer 4060D, For Heat Seal Layer in Coextruded Oriented Films, 2005.
NatureWorks article entitled NatureWorks, Crystallizing and Drying of PLA, 2005.
Office Action for U.S. Appl. No. 11/046,652 dated Dec. 14, 2009.
Office Action mailed Sep. 4, 2008 for U.S. Appl. No. 11/046,652.
Office Action for U.S. Appl. No. 12/760,385 dated Jan. 10, 2011.

\* cited by examiner

METHODS AND COMPOSITIONS RELATING TO THE HYDROLYSIS OF WATER-HYDROLYSABLE MATERIALS

CROSS REFERENCE TO RELATED APPLICATIONS

The present invention is related to co-pending U.S. application Ser. No. 11/046,652 entitled "Methods and Compositions Relating to the Hydrolysis of Water-Hydrolysable Materials" filed concurrently herewith and published as U.S. Publication No. 2006-0169182, the entire disclosure of which is incorporated herein by reference.

BACKGROUND

The present invention relates to water-hydrolysable materials and, more particularly, to treatment fluids and associated methods relating to the hydrolysis of water-hydrolysable materials.

Water-hydrolysable materials are commonly employed in subterranean operations. For instance, water-hydrolysable materials may be used in subterranean operations as fluid loss control particles, diverting agents, filter cake components, drilling fluid additives, cement additives, and the like. In some instances, the water-hydrolysable material may be in a mechanical form (e.g., plugs, sleeves, and the like). In another instance, the water-hydrolysable material may be capable of releasing a desirable degradation product, e.g., an acid, during its hydrolysis. The acid released by certain water-hydrolysable materials may be used to facilitate a reduction in viscosity of a fluid or to degrade a filter cake, as well as for numerous other functions in subterranean operations.

Inclusion of a water-hydrolysable material capable of releasing an acid in a gelled (and optionally crosslinked) treatment fluid may be used to facilitate a reduction in viscosity of such fluid. Generally, these water-hydrolysable materials likely will hydrolyze over time due to contact with water present in the fluid, thereby releasing an acid. Upon its hydrolysis, the acid will function, inter alia, to reduce the viscosity of the gelled (and optionally crosslinked) treatment fluid, for example, by breaking the crosslinks in the treatment fluid, reducing the pH of the treatment fluid sufficiently to reverse the crosslinks therein, and/or breaking down the backbone of the gelling agent present in the treatment fluid. Typically, the acid released by the water-hydrolysable materials may breakdown the gelling agents at temperatures above about 150° F.

Water-hydrolysable materials capable of releasing an acid also may be used in the degradation of acid-soluble materials present in a subterranean formation, such as those present in or adjacent to filter cakes. Filter cakes commonly may be formed by a fluid (e.g., a drill-in and servicing fluid) on the face of a portion of a subterranean formation, inter alia, to minimize damage to the permeability thereof. The filter cake often comprises an acid-soluble component (e.g., a calcium carbonate bridging agent) and a polymeric component (e.g., starch and xanthan). Before desirable fluids, such as hydrocarbons, may be produced, the filter cake generally is removed. To facilitate the degradation of the acid-soluble component, a water-hydrolysable material capable of releasing an acid may be utilized. Filter cakes also may be removed using an acid where the filter cake does not contain an acid-soluble component, for example, by degrading the underlying carbonate adjacent, if the filter cake is present in a carbonate formation.

In one instance, the filter cake may be contacted by a treatment fluid that comprises the water-hydrolysable material. The resultant acid should interact with the acid-soluble component of the filter cake and/or the underlying carbonate adjacent to the filter cake in such a way as to facilitate their degradation. In another instance, the water-hydrolysable material capable of releasing an acid may be included in the fluid (such as the drill-in and servicing fluid) that forms the filter cake, such that the filter cake further contains the water-hydrolysable material. Subsequent contact of the filter cake with an aqueous fluid hydrolyzes the water-hydrolysable material thereby releasing an acid that acts to degrade the acid soluble component of the filter cake. Among other components, the aqueous fluid may contain oxidizing agents or enzymes suitable to facilitate the degradation of the polymeric component of the filter cake.

Use of water-hydrolysable materials capable of releasing an acid may be problematic, for example, if the water-hydrolysable material hydrolyzes too slowly or too quickly. For example, where used to facilitate a reduction in viscosity of a treatment fluid, the treatment fluid may need to have a desired viscosity for a requisite duration to ensure a desirable well treatment. In some instances, as the temperature in the well bore increases, the hydrolysis rate of the water-hydrolysable material increases, which may lead to an untimely or undesired reduction in viscosity of the treatment fluid. One method used to reduce the hydrolysis rate of the water-hydrolysable material may be to encapsulate it in a slowly soluble coating that can delay the hydrolysis of the water-hydrolysable material and thus delay release of the resulting acid. However, encapsulation of the water-hydrolysable material may add undesired expense and complexity. Further, where the water-hydrolysable material has a relatively small particle size, e.g., less than about 200 microns, encapsulation may not be practicable. Also, while it is possible to "tune" the water-hydrolysable material through various methodologies (e.g., initial choice of material, choice of plasticizers, molecular weight of the material, etc.), these methods may not be sufficient to extend or decrease the degradation time appropriately and/or may not be economical.

SUMMARY

The present invention relates to water-hydrolysable materials and, more particularly, to treatment fluids and associated methods relating to the hydrolysis of water-hydrolysable materials.

In one embodiment, the present invention provides a method of treating at least a portion of a subterranean formation, the method comprising: providing a water-hydrolysable material; introducing the water-hydrolysable material into a well bore penetrating the subterranean formation; providing a treatment fluid comprising an aqueous liquid and a water-miscible solvent; introducing the treatment fluid into the well bore so as to contact the water-hydrolysable material; and allowing the water-hydrolysable material to hydrolyze.

In another embodiment, the present invention provides a method of treating at least a portion of a subterranean formation, the method comprising: providing a treatment fluid comprising an aqueous liquid, a water-miscible solvent, a water-hydrolysable material capable of releasing an acid, and a gelling agent; introducing the treatment fluid into a well bore penetrating the subterranean formation; allowing the water-hydrolysable material to hydrolyze so as to release an acid; and allowing the acid to facilitate a reduction in viscosity of the treatment fluid.

In another embodiment, the present invention provides a method of completing a well, the method comprising: providing a treatment fluid comprising an aqueous liquid, a water-hydrolysable material capable of releasing an acid, a water-miscible solvent, and a gelling agent; introducing the treatment fluid into a well bore in an amount sufficient to fill a portion of the well bore that penetrates a permeable section of a subterranean formation; introducing a completion fluid into the well bore, subsequent to the introducing the treatment fluid into the well bore; and allowing the water-hydrolysable material to hydrolyze so as to release an acid; wherein the acid facilitates a reduction in viscosity of the treatment fluid.

The features and advantages of the present invention will be readily apparent to those skilled in the art upon a reading of the description of the specific embodiments that follows.

DRAWINGS

Figure 2:
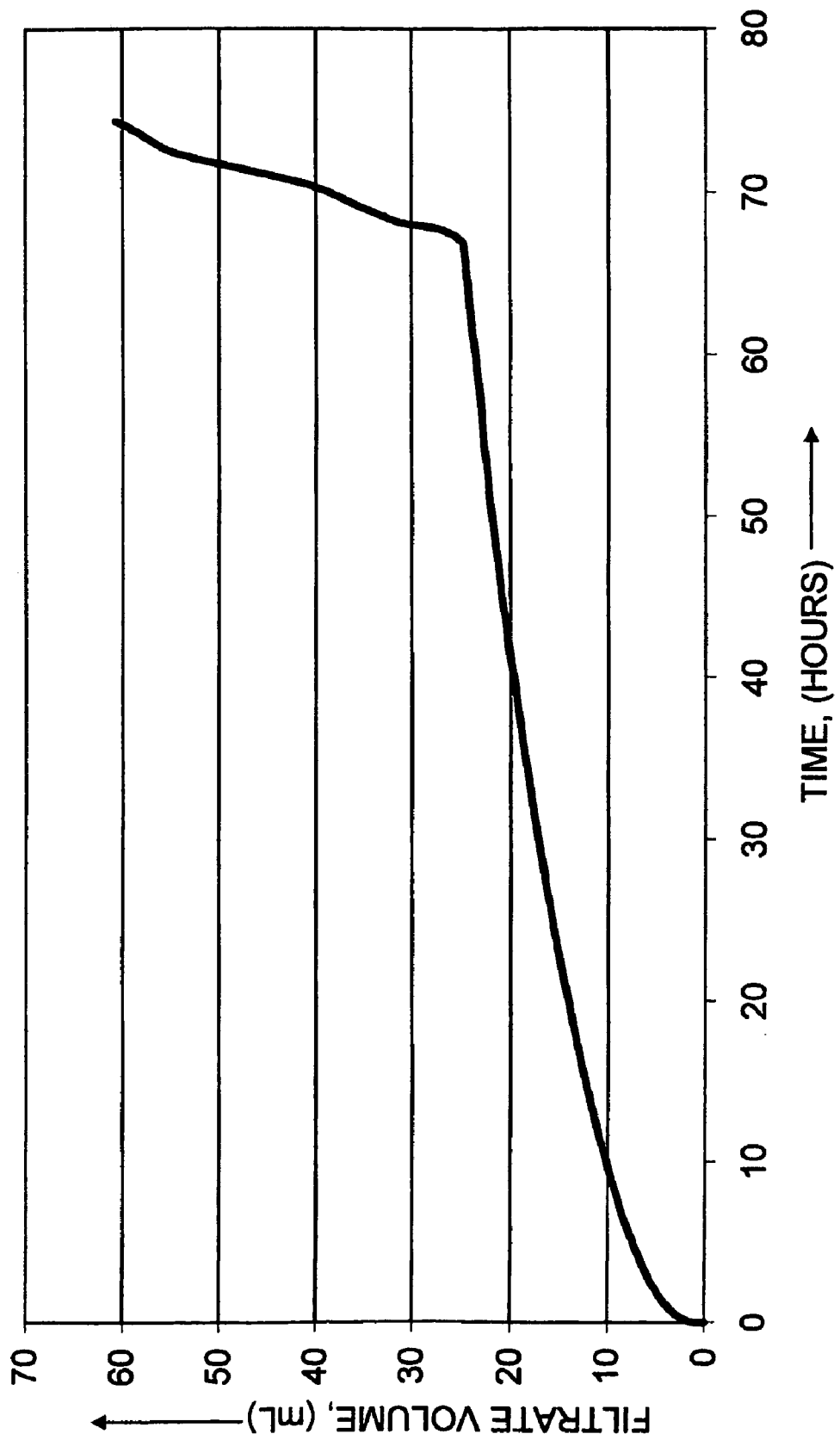

A more complete understanding of the present disclosure and advantages thereof may be acquired by referring to the following description taken in conjunction with the accompanying drawings, wherein:

FIG. 1 is a graph illustrating the break time of a crosslinked fluid that did not comprise a water-miscible solvent; and FIG. 2 is a graph illustrating the break time of a crosslinked fluid that comprised a water-miscible solvent.

DESCRIPTION

The present invention relates to water-hydrolysable materials and, more particularly, to treatment fluids and associated methods relating to the hydrolysis of water-hydrolysable materials. The water-hydrolysable materials may be used in subterranean operations for a number of functions, including, but not limited to, fluid loss control particles, diverting agents, filter cake components, drilling fluid additives, cement additives, and the like. In some instances, the water-hydrolysable material may be in a mechanical form (e.g., plugs, sleeves, and the like). In some instances, the water-hydrolysable material may be capable of releasing a desirable degradation product, e.g., an acid, during its hydrolysis. The acid released by certain water-hydrolysable materials may be used to facilitate a reduction in viscosity of a fluid or to degrade a filter cake, as well as for numerous other functions in subterranean operations.

The treatment fluids of the present invention generally comprise an aqueous liquid and a water-miscible solvent. Among other things, because the amount of water in a treatment fluid of the present invention is reduced due to the inclusion of a water-miscible solvent therein, the hydrolysis of a water-hydrolysable material contacted by the treatment fluid or present within the treatment fluid should be at least partially delayed. For example, a hydrolysis retarder composition may comprise an aqueous liquid and a water-miscible solvent. Depending on the application, the treatment fluids of the present invention further may comprise at least one of the following: a water-hydrolysable material, a gelling agent, a crosslinking agent, or additional additives suitable for a particular application.

The aqueous liquid utilized in the treatment fluids of the present invention may be fresh water, saltwater (e.g., water containing one or more salts dissolved therein), brine (e.g., saturated saltwater), or seawater. In certain embodiments, the aqueous liquid may comprise at least one salt of potassium chloride, sodium chloride, calcium chloride, zinc chloride, potassium bromide, sodium bromide, calcium bromide, zinc bromide, sodium formate, potassium formate, or cesium formate. Among other things, the salt may be included in the aqueous liquid for density control. In some embodiments, the aqueous liquid may have a density in the range of from about 8.33 pounds per gallon ("ppg") to about 21.5 ppg. Generally, the aqueous liquid may be from any source provided that it does not contain an excess of compounds (e.g., dissolved organics) that may adversely affect a treatment fluid of the present invention. In certain embodiments, the aqueous liquid may be present in the treatment fluids of the present invention in an amount in the range of from about 1% to about 80% by weight of the treatment fluid therein. In certain embodiments, the aqueous liquid may be present in the treatment fluids of the present invention in an amount in the range of from about 20% to about 80% by weight of the treatment fluid therein. One of ordinary skill in the art, with the benefit of this disclosure, will recognize the appropriate amount of water for a chosen application.

Generally, any water-miscible solvent may be used in the present invention. Among other things, inclusion of the water-miscible solvent in the treatment fluids of the present invention should act to at least partially delay the hydrolysis of a water-hydrolysable material present within or contacted by the treatment fluids of the present invention. Examples of suitable water-miscible solvents include, but are not limited to, alcohols such as methanol, glycols such as propylene glycol and ethylene glycol, ethers such as ethylene glycol monobutyl ether, esters such as propylene carbonate and ethylene glycol monomethyl acetate, derivatives thereof, and combinations thereof. Additional examples of suitable water-miscible solvents are those described in Kirk-Othmer, Fourth Edition, Volume 22, pp 536-553. Generally, the water-miscible solvent should be included in the treatment fluids of the present invention in an amount sufficient to at least partially delay the hydrolysis of the water-hydrolysable material. In some embodiments, the water-miscible solvent may be present in the treatment fluids of the present invention in an amount in the range of from about 20% to about 99% by weight of the treatment fluid. In some embodiments, the water-miscible solvent may be present in the treatment fluids of the present invention in an amount in the range of from about 20% to about 80% by weight of the treatment fluid. The amount of the water-miscible solvent to include in the treatment fluids of the present invention depends on a number of factors, including, the desired hydrolysis rate of the water-hydrolysable material, the desired density of the treatment fluid, and the hydration needs of other additives present in the treatment fluid.

A wide variety of gelling agents may be employed in the treatment fluids of the present invention. While optional, one or more gelling agents may be included in a treatment fluid of the present invention for gelling the water and increasing the treatment fluid's viscosity. Examples of suitable gelling agents include, but are not limited to, biopolymers (e.g., xanthan and succinoglycan), galactomannan gums, modified celluloses, and derivatives thereof, combinations thereof, and the like. Suitable galactomannan gums include, but are not limited to, gum arabic, gum ghatti, gum karaya, tamarind gum, tragacanth gum, guar gum, locust bean gum, and the like. Suitable galactomannan gum derivatives include, but are not limited to, guar gum derivatives, such as hydroxypropylguar ("HPG"), carboxymethylhydroxypropylguar ("CM-HPG"), and carboxymethylguar ("CMG").

Modified celluloses and derivatives thereof such as cellulose ethers, cellulose esters, and the like are also suitable for use as gelling agents in accordance with the present invention. In some embodiments, the gelling agent may be a water-soluble cellulose ether, including, but not limited to, carboxyalkylcellulose ethers such as carboxyethylcellulose and carboxymethylcellulose; mixed ethers such as carboxymethylhydroxyethylcellulose; hydroxyalkylcelluloses such as hydroxyethylcellulose ("HEC") and hydroxypropylcellulose; alkylhydroxyalkylcelluloses such as methylhydroxypropylcellulose; alkylcelluloses such as methylcellulose, ethylcellulose, and propylcellulose; alkylcarboxyalkylcelluloses such as ethylcarboxymethylcellulose; alkylalkylcelluloses such as methylethylcellulose; hydroxyalkylalkylcelluloses such as hydroxypropylmethylcellulose; and the like.

In certain embodiments, the derivatized cellulose is a cellulose grafted with an allyl or a vinyl monomer, such as those disclosed in U.S. Pat. Nos. 4,982,793; 5,067,565; and 5,122,549, the relevant disclosures of which are incorporated herein by reference. The allyl or vinyl monomer should have a crosslinkable substituent, such as a vicinal dihydroxy group or a phosphonate group, which should allow the derivatized cellulose to crosslink. Examples of suitable allyl or vinyl monomers include, but are not limited to, glyceryl allyl ether (GAE), 2,3-dihydroxypropylmethacrylate (DHPM), vinyl phosphonic acid (VPA), allyl glycidyl ether (AGE), glycidyl methacrylate (GMA), and combinations thereof. In one certain embodiment, the gelling agent comprises HEC grafted with VPA. An example of a suitable gelling agent comprising HEC grafted with VPA is commercially available from Halliburton Energy Services, Inc., Duncan, Okla., as "WG-33™" gelling agent.

Where present, the gelling agent generally should be included in the treatment fluids of the present invention in an amount sufficient, among other things, to achieve the desired viscosity thereof. In some embodiments, a gelling agent may be present in the treatment fluids of the present invention in amount in the range of from about 0.25% to about 10% by weight of the treatment fluid. In other embodiments, the gelling agent may be present in the treatment fluids of the present invention in amount in the range of from about 0.75% to about 1.5% by weight of the treatment fluid.

While optional, at least a portion of the gelling agent included in the treatment fluids of the present invention may be crosslinked by a reaction comprising a crosslinking agent, e.g., to further increase the treatment fluid's viscosity thereof. Crosslinking agents typically comprise at least one metal ion that is capable of crosslinking gelling agent molecules. Examples of suitable crosslinking agents include, but are not limited to, zirconium compounds (such as, for example, zirconium lactate, zirconium lactate triethanolamine, zirconium carbonate, zirconium acetylacetonate, zirconium malate, zirconium citrate, and zirconium diisopropylamine lactate); titanium compounds (such as, for example, titanium lactate, titanium malate, titanium citrate, titanium ammonium lactate, titanium triethanolamine, and titanium acetylacetonate); aluminum compounds (such as, for example, aluminum lactate or aluminum citrate); borate compounds (such as, for example, sodium tetraborate, boric acid, disodium octaborate tetrahydrate, sodium diborate, ulexite, and colemanite); antimony compounds; chromium compounds; iron compounds; copper compounds; zinc compounds; or a combination thereof. An example of a suitable commercially available zirconium-based crosslinking agent is "CL-24™" crosslinker from Halliburton Energy Services, Inc., Duncan, Okla. An example of a suitable commercially available titanium-based crosslinking agent is "CL-39™" crosslinker from Halliburton Energy Services, Inc., Duncan Okla. An example of a suitable borate-based crosslinking agent is commercially available as "CL-22™" delayed borate crosslinker from Halliburton Energy Services, Inc., Duncan, Okla. Divalent ions also may be used; for example, calcium chloride and magnesium oxide. An example of a suitable divalent ion crosslinking agent is commercially available as "CL-30™" from Halliburton Energy Services, Inc., Duncan, Okla. Where present, the crosslinking agent generally should be included in the treatments fluid of the present invention in an amount sufficient, among other things, to provide the desired degree of crosslinking. In some embodiments, the crosslinking agent may be present in the treatment fluids of the present invention in an amount in the range of from about 0.01% to about 5.0% by weight of the treatment fluid.

Water-hydrolysable materials suitable for use in the present invention are those capable of degrading when contacted by water. Water-hydrolysable materials that may be used in conjunction with the present invention include, but are not limited to, degradable polymers, lactides, lactones, esters, dehydrated compounds, derivatives thereof, and combinations thereof. Those of ordinary skill in the art, with the benefit of this disclosure, will recognize other suitable water-hydrolysable materials for a particular application. Generally, the water-hydrolysable materials should degrade over time as opposed to immediately. The terms "degrading," "degradation," and "degradable" refer to both the relatively extreme cases of hydrolytic degradation that the degradable material may undergo, i.e., heterogeneous (or bulk erosion) and homogeneous (or surface erosion), and any stage of degradation in between these two. In some embodiments, the water-hydrolysable materials may be capable of releasing an acid upon hydrolysis. Among other things, the water-hydrolysable materials capable of releasing an acid should degrade after a desired time to release an acid, for example, to degrade a filter cake or to reduce the viscosity of a treatment fluid.

In certain embodiments, the water-hydrolysable materials comprise a degradable polymer capable of hydrolyzing when contacted by water. Suitable examples of degradable polymers that may be used in accordance with the present invention include, but are not limited to, homopolymers, random, block, graft, and star- and hyper-branched polymers. Examples of suitable degradable polymers, include, but are not limited to, polysaccharides such as dextran or cellulose; chitin; chitosan; proteins; aliphatic polyesters; poly(lactic acids); poly(glycolides); poly(ε-caprolaciones); poly(hydroxybutyrates); poly(anhydrides); aliphatic polycarbonates; poly(orthoesters); poly(amino acids); poly(ethylene oxide); polyphosphazenes, polyvinyl alcohols, and copolymers and blends of any of these degradable polymers. The term "copolymer" as used herein is not limited to the combination of two polymers, but includes any combination of polymers, e.g., terpolymers and the like. Certain of these degradable polymers are capable of releasing an acid upon hydrolysis. For example, poly(lactic acids) and poly(glycolides), among others, are capable of releasing an acid upon hydrolysis.

Preferred aliphatic polyesters have the general formula of repeating units shown below:

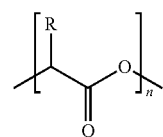

Formula I where n is an integer between 75 and 10,000 and R is a hydrogen, alkyl, aryl, alkylaryl, acetyl, heteroatoms, or mixtures thereof. Of these aliphatic polyesters, poly(lactic acid) is preferred. Poly(lactic acid) is synthesized either from lactic acid by a condensation reaction or more commonly by ring-opening polymerization of cyclic lactide monomer. Since both lactic acid and lactide can achieve the same repeating unit, the general term poly(lactic acid) as used herein refers to formula I without any limitation as to how the polymer was made such as from lactides, lactic acid, or oligomers, and without reference to the degree of polymerization or level of plasticization. The lactide monomer exists generally in three different forms: two stereoisomers L- and D-lactide and racemic D,L-lactide (meso-lactide). The oligomers of lactic acid, and oligomers of lactide are defined by the formula:

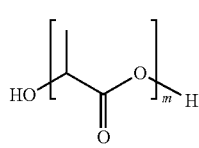

Formula II where m is an integer $2 \leq m \leq 75$. Preferably m is an integer and $2 \leq m \leq 10$. These limits correspond to number average molecular weights below about 5,400 and below about 720, respectively. The chirality of the lactide units provides a means to adjust, inter alia, degradation rates, as well as physical and mechanical properties. Poly(L-lactide), for instance, is a semicrystalline polymer with a relatively slow hydrolysis rate. This could be desirable in applications of the present invention where a slower degradation of the degradable particulates is desired. Poly(D,L-lactide) may be a more amorphous polymer with a resultant faster hydrolysis rate. This may be suitable for other applications where a more rapid degradation may be appropriate. The stereoisomers of lactic acid may be used individually or combined to be used in accordance with the present invention. Additionally, they may be copolymerized with, for example, glycolide or other monomers like ε-caprolactone, 1,5-dioxepan-2-one, trimethylene carbonate, or other suitable monomers to obtain polymers with different properties or degradation times. Additionally, the lactic acid stereoisomers can be modified to be used in the present invention by, inter alia, blending, copolymerizing or otherwise mixing the stereoisomers, blending, copolymerizing or otherwise mixing high and low molecular weight poly(lactides), or by blending, copolymerizing or otherwise mixing a poly(lactic acid) with another polyester or polyesters.

One skilled in the art will recognize that plasticizers may be included in forming suitable polymeric degradable materials of the present invention. The plasticizers may be present in an amount sufficient to provide the desired characteristics, for example, more effective compatibilization of the melt blend components, improved processing characteristics during the blending and processing steps, and control and regulation of the sensitivity and degradation of the polymer by moisture.

Suitable dehydrated compounds are those materials that will degrade over time when rehydrated. For example, a particulate solid dehydrated salt or a particulate solid anhydrous borate material that degrades over time may be suitable. Specific examples of particulate solid anhydrous borate materials that may be used include but are not limited to anhydrous sodium tetraborate (also known as anhydrous borax) and anhydrous boric acid. These anhydrous borate materials are only slightly soluble in water. However, with time and heat in a subterranean environment, the anhydrous borate materials react with the surrounding aqueous fluid and are hydrated. The resulting hydrated borate materials are substantially soluble in water as compared to anhydrous borate materials and as a result degrade in the aqueous fluid.

In choosing the appropriate water-hydrolysable material, one should consider the degradation products that will result. Also, these degradation products should not adversely affect other operations or components. The choice of a water-hydrolysable material also can depend, at least in part, on the conditions of the well, e.g., well bore temperature. For instance, aliphatic polyesters have been found to be suitable for well bore temperatures in the range of 180° F. to 400° F. And, for example, lactides may be suitable for well bore temperatures less than about 180° F. Generally, lower molecular weight water-hydrolysable materials are suitable for use in lower temperature applications and higher molecular weight acid-releasing degradable materials are suitable for use in higher-temperature applications. It is within the ability of one skilled in the art, with the benefit of this disclosure, to select a suitable water-hydrolysable material.

Blends of certain water-hydrolysable materials may also be suitable. One example of a suitable blend of materials includes a blend of poly(lactic acid) and a lactide. Other materials that undergo degradation may also be suitable, if the products of the degradation do not undesirably interfere with either the subterranean treatment being performed or the subterranean formation.

The water-hydrolysable material may be included in the treatment fluids of the present invention in an amount sufficient for a particular application. For example, in embodiments where water-hydrolysable materials capable of releasing an acid are used, the water-hydrolysable material should be present in the treatment fluids of the present invention in an amount sufficient to release a desired amount of acid. In some embodiments, the amount of the released acid should be sufficient to reduce the viscosity of the treatment fluid to a desired level. In another embodiment, the amount of the released acid should be sufficient to facilitate the degradation of an acid-soluble component, for example, an acid-soluble component of a filter cake or an acid-soluble component adjacent to a filter cake. In certain embodiments, the water-hydrolysable material may be present in the treatment fluid in an amount in the range of from about 1% to about 30% by weight of the treatment fluid. In certain embodiments, the water-hydrolysable material may be present in the treatment fluid in an amount in the range of from about 3% to about 10% by weight of the treatment fluid. One of ordinary skill in the art, with the benefit of this disclosure, will be able to determine the appropriate amount of the water-hydrolysable degradable material to include in the treatment fluids of the present invention for a particular application.

The desired hydrolysis rate of the water-hydrolysable material will vary dependent on the particular application. As previously discussed, inclusion of a water-miscible solvent in the treatment fluids of the present invention should reduce the hydrolysis rate of the water-hydrolysable material. By adjusting the concentration of the water-miscible solvent in the treatment fluids of the present invention, the hydrolysis rate of the water-hydrolysable material may be controlled. One of ordinary skill in the art, with the benefit of this application, will be able to determine the appropriate hydrolysis rate of the water-hydrolysable material for a particular application.

The treatment fluids of the present invention may further comprise additional additives as deemed appropriate by one of ordinary skill in the art, with the benefit of this disclosure. Examples of such additional additives include, but are not limited to, pH-adjusting agents, pH-buffers, oxidizing agents, enzymes, lost circulation materials, scale inhibitors, surfactants, clay stabilizers, fluid loss control additives, combinations thereof, and the like.

Generally, the present invention comprises utilizing a treatment fluid of the present invention to at least partially delay the hydrolysis of a water-hydrolysable material. In one certain embodiment, the present invention provides a method of treating at least a portion of subterranean formation, the method comprising: providing a water-hydrolysable material; introducing the water-hydrolysable material into a well bore penetrating the subterranean formation; providing a treatment fluid comprising an aqueous liquid and a water-miscible solvent; introducing the treatment fluid into the well bore so as to contact the water-hydrolysable material; and allowing the water-hydrolysable material to hydrolyze. Generally, the treatment fluid may be introduced into the well bore subsequent to, or simultaneously with, the introduction of the water-hydrolysable material into the well bore. In certain embodiments, the treatment fluid may further comprise the water-hydrolysable material.

The water-hydrolysable material may be introduced into the well bore for any of a number of uses. For instance, water-hydrolysable materials may be used in subterranean operations as fluid loss control particles, diverting agents, filter cake components, drilling fluid additives, cement additives, and the like. In some embodiments, the water-hydrolysable material may be in a mechanical form (e.g., plugs, sleeves, and the like). In some instances, the water-hydrolysable material may be capable of releasing a desirable degradation product, e.g., an acid, during its hydrolysis. At a chosen time or after a desired delay period, the water-hydrolysable material should be allowed to hydrolyze so as to release an acid.

In some embodiments, the acid released by certain water-hydrolysable materials may be used to degrade acid-soluble components present in the subterranean formation. In some embodiments, the acid-soluble component may be present in or adjacent to a filter cake in the subterranean formation. In another embodiment, the acid-soluble component may be other acid-soluble damage present in the subterranean formation (e.g., in the near well bore region). In some embodiments, the water-hydrolysable material is present in the treatment fluid. In other embodiments, the water-hydrolysable material is present in a filter cake that is present in the subterranean formation. For example, the water-hydrolysable material may be introduced into the formation as part of the fluid that forms the filter cake, such that the filter cake contains the water-hydrolysable material. As those of ordinary skill in the art will appreciate, the treatment fluid may need to be shut in for a period of time to allow for the desired amount of acid to be released.

In some embodiments, the acid released by certain water-hydrolysable materials may be used to facilitate a reduction in viscosity of the treatment fluid, for example, wherein the treatment fluid comprises a gelling agent. As previously discussed, at least a portion of the gelling agent may be crosslinked by a reaction comprising a crosslinking agent. The treatment fluid may be recovered from the well bore subsequent to its reduction in viscosity. Where used to facilitate a reduction in viscosity of a treatment fluid, the treatment operation may be any of a variety of subterranean treatments employed in subterranean operations where a viscosified fluid may be used, including, fracturing, gravel packing, chemical diversions, and fluid loss control treatments.

For example, in one certain embodiment, the present invention provides a method of completing a well comprising providing a treatment fluid of the present invention that comprises an aqueous liquid, a water-miscible solvent, a water-hydrolysable material capable of releasing an acid, and a gelling agent; and introducing the treatment fluid of the present invention into a well bore in an amount sufficient to fill a portion of the well bore within a permeable section of a subterranean formation. As previously discussed, at least a portion of the gelling agent may be crosslinked by a reaction comprising a crosslinking agent. As those of ordinary skill in the art will appreciate, with the benefit of this disclosure, the treatment fluids of the present invention further may comprise other additives suitable for a particular application. Generally, in these embodiments, the treatment fluid of the present invention should have sufficient rigidity to resist entry into the permeable section of the subterranean formation. Subsequent to placement of the treatment fluid of the present invention into the portion of the well bore, a high-density completion fluid may be placed into the well bore behind the treatment fluid. In some embodiments, the treatment fluid may have about the same density as the high-density treatment fluid. Among other things, the treatment fluid of the present invention should block the high-density completion fluid from being lost or entering the permeable section of the subterranean formation. Furthermore, the total hydrostatic pressure exerted onto the subterranean formation by the high-density completion fluid plus the treatment fluid of the present invention should be sufficient to provide well control. At a chosen time or after a desired delay period, the water-hydrolysable material should be allowed to hydrolyze so as to release an acid that facilitates a reduction in the treatments fluid's viscosity. The treatment fluid may be recovered from the well bore subsequent to its reduction in viscosity.

To facilitate a better understanding of the present invention, the following example of specific embodiments is given. In no way should the following examples be read to limit, or define, the scope of the invention.

Example

Tests were performed on samples of various fluids in order to compare the relative break times of the fluids. Sample Fluid No. 1 was a crosslinked treatment fluid that was prepared without the addition of a water-miscible solvent. Sample Fluid No. 2 was a crosslinked treatment fluid that comprised propylene glycol. The tests were performed at 195° F. in a Fann HPHT Filter Press according to the steps listed in Table 1 below.

TABLE 1

| Step No. | 1 | 2 | 3 | 4 | 5 | 6 | 7 | 8 |
|---|---|---|---|---|---|---|---|---|
| Step Time (min) | 0 | 0 | 2 | 999 | 999 | 999 | 999 | 0 |
| Static Pressure (psi) | 800 | 800 | 800 | 800 | 800 | 800 | 800 | 0 |
| Differential Pressure | 0 | 100 | 100 | 100 | 100 | 100 | 100 | 0 |
| Temperature (° F.) | 195 | 195 | 195 | 195 | 195 | 195 | 195 | 115 |
| Filtrate Valve | Off | Off | Off | On | On | On | On | Off |

Sample Fluid No. 1 was prepared by pouring 500 ml of an 11.6 ppg calcium chloride brine into a Waring blender while mixing. Next, 21.55 ml of WG-33™ gelling agent were added to the blender while mixing. Thereafter, 2.5 ml of 20° Be hydrochloric acid were added to the blender while mixing. The resulting solution was mixed for 5 additional minutes, and the solution was then allowed to hydrate for about 1 hour.

After the 1-hour hydration period, 200 ml of the above-prepared solution was used for the remainder of this test. Next, 7 grams of 18/20 mesh particulate poly(lactic acid) was added to the 200 ml of the solution. Thereafter, 0.72 grams of CL-30™ crosslinker were added to the blender while mixing. The resultant solution was emptied into a jar and remained static at room temperature for 1 hour to ensure crosslinking.

After the 1-hour waiting period, Sample Fluid No. 1 was placed into the HPHT cell using a 35-micron disc with a piston on top. The results from this test are illustrated in FIG. 1. As shown illustrated by FIG. 1, Sample Fluid No. 1 had a break time of about 49 hours.

Sample Fluid No. 2 was prepared by pouring 220.5 ml of propylene glycol into a Waring blender while mixing. Next, 13.5 ml of WG-33™ gelling agent were added to the blender while mixing. The resulting solution was mixed for 5 minutes. Thereafter, 1.6 ml of 20° Be hydrochloric acid were added to the blender while mixing. Next, 94.5 ml of an 11.6 ppg calcium chloride brine was added to the blender while mixing. The resulting solution was mixed for 5 additional minutes, and the solution was then allowed to hydrate for about 1 hour. After the 1-hour hydration period, 200 ml of the above-prepared solution was used for the remainder of this test. Next, 7 grams of 18/20 mesh particulate poly(lactic acid) was added to the 200 ml of the solution. Thereafter, 0.72 grams of CL-30™ crosslinker were added to the blender while mixing. The resultant solution was emptied into a jar and remained static at room temperature for 1 hour to ensure crosslinking.

After the 1-hour waiting period, Sample Fluid No. 2 was placed into the HPHT cell using a 35 micron disc with a piston on top. The results from this test are illustrated in FIG. 2. As shown illustrated by FIG. 2, Sample Fluid No. 2 had a break time of about 67 hours.

Therefore, this example shows that the inclusion of a water-miscible solvent in the treatment fluids of the present invention may control the hydrolysis rate of a water-hydrolysable material included therein.

Therefore, the present invention is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. A method of treating at least a portion of a subterranean formation, the method comprising:
providing a solid water-hydrolysable material selected from the group consisting of: a chitin; a chitosan; a protein; a poly(hydroxybutyrate); a poly(anhydride); and aliphatic polycarbonate; a poly(orthoester); a poly(amino acid); a polyphoxphazene; a polyvinyl alcohol; or a copolymer thereof;
introducing the solid water-hydrolysable material into a well bore penetrating the subterranean formation;
providing a treatment fluid comprising an aqueous liquid and about 20% to about 99% by weight of the treatment fluid of propylene carbonate;
introducing the treatment fluid into the well bore so as to contact the solid water-hydrolysable material; and
hydrolyzing the solid water-hydrolysable material.

2. The method of claim 1 wherein a second water-hydrolysable material selected from the group consisting of a degradable polymer, a lactide, a lactone, an ester, a poly($\epsilon$-caprolactone), and a dehydrated compound is combined with the solid water-hydrolysable material.

3. The method of claim 1 wherein the solid water-hydrolysable material is introduced into the well bore as a particle selected from the group consisting of a fluid loss control particle, a diverting agent, a filter cake component, a drilling fluid additive, and a cement additive.

4. The method of claim 1 wherein the solid water-hydrolysable material is in a mechanical form.

5. The method of claim 1 wherein the solid water-hydrolysable material releases an acid upon hydrolysis.

6. The method of claim 5 further comprising allowing the acid to facilitate a reduction in the viscosity of the treatment fluid, the treatment fluid further comprising a gelling agent.

7. The method of claim 5 further comprising allowing the acid to degrade an acid-soluble component present in the subterranean formation.

8. The method of claim 7 wherein the acid-soluble component is present in a filter cake that is present in the subterranean formation; the acid-soluble component is adjacent to a filter cake that is present in the subterranean formation; or the acid-soluble component is other damage present in the subterranean formation.

9. The method of claim 1 wherein the treatment fluid comprises the solid water-hydrolysable material.

10. The method of claim 1 wherein the treatment fluid further comprises a gelling agent selected from the group consisting of: a biopolymer, a galactomannan gum, and a modified cellulose.

11. A method of treating at least a portion of a subterranean formation, the method comprising:
providing a treatment fluid comprising an aqueous liquid, a water-miscible solvent, a solid water-hydrolysable material capable of releasing an acid, and a gelling agent, wherein the water-miscible solvent is propylene carbonate and is added in an amount from comprises about 20% to about 99% by weight of the treatment fluid,
wherein the solid water-hydrolysable material is selected from the group consisting of: a chitin; a chitosan; a protein; a poly($\epsilon$-caprolactone); a poly(hydroxybutyrate); a poly(anhydride); an aliphatic polycarbonate; a poly(orthoester); a poly(amino acid); a polyphosphazene; a polyvinyl alcohol; or a copolymer thereof;
introducing the treatment fluid into a well bore penetrating the subterranean formation;
hydrolyzing the water-hydrolysable material so as to release an acid; and
reducing the viscosity of the treatment fluid.

12. The method of claim 11 wherein the treatment fluid further comprises a second water-hydrolysable material selected from the group consisting of a degradable polymer, a lactide, a lactone, an ester, and a dehydrated compound.

13. The method of claim 11 wherein at least a portion of the gelling agent is crosslinked.

14. A method comprising:
providing a solid water-hydrolysable material;
introducing the solid water-hydrolysable material into a well bore penetrating the subterranean formation;
providing a treatment fluid comprising an aqueous liquid and a water-miscible solvent, wherein the water-miscible solvent is propylene carbonate and is added in an amount from comprises about 20% to about 99% by weight of the treatment fluid;
introducing the treatment fluid into the well bore so as to contact the solid water-hydrolysable material, wherein the treatment fluid is introduced into the well bore subsequent to introduction of the solid water-hydrolysable material; and hydrolyzing the solid water-hydrolysable material.

15. The method of claim 14 wherein the solid water-hydrolysable material releases an acid upon hydrolysis.

16. The method of claim 15 further comprising allowing the acid to degrade an acid-soluble component present in the subterranean formation.

17. The method of claim 11, wherein the treatment fluid further comprises an alcohol or a glycol.

* * * * *